(12) United States Patent
Chen

(10) Patent No.: US 7,393,170 B2
(45) Date of Patent: Jul. 1, 2008

(54) SCREW WITH GUIDE WINGS

(76) Inventor: Chin-Sun Chen, No. 35, Lane 193, Gangshan N, Rd., Gangshan township, Kaohsiung county 820 (TW)

( * ) Notice: Subject to any disclaimer, the term of this patent is extended or adjusted under 35 U.S.C. 154(b) by 32 days.

(21) Appl. No.: 11/062,810

(22) Filed: Feb. 23, 2005

(65) Prior Publication Data
US 2006/0153662 A1    Jul. 13, 2006

(51) Int. Cl.
    *F16B 25/10* (2006.01)
(52) U.S. Cl. .................. 411/387.1; 411/387.7; 411/412
(58) Field of Classification Search .............. 411/386, 411/387.1–387.8, 311
See application file for complete search history.

(56) References Cited

U.S. PATENT DOCUMENTS

| | | | | |
|---|---|---|---|---|
| 2,135,637 | A * | 11/1938 | Gade | 411/311 |
| 2,349,593 | A * | 5/1944 | Hosking | 411/311 |
| 2,484,644 | A * | 10/1949 | Poupitch | 411/311 |
| 2,993,950 | A * | 7/1961 | Forman | 174/138 D |
| 3,045,523 | A * | 7/1962 | Reed | 411/387.1 |
| 3,076,208 | A * | 2/1963 | Moore | 470/8 |
| 3,094,894 | A * | 6/1963 | Broberg | 411/387.4 |
| 3,176,746 | A * | 4/1965 | Walton | 411/259 |
| 3,207,024 | A * | 9/1965 | Sommer | 411/387.1 |
| 4,028,987 | A * | 6/1977 | Wilson | 411/387.2 |
| 4,323,326 | A * | 4/1982 | Okada et al. | 411/412 |
| 4,329,099 | A * | 5/1982 | Shimizu et al. | 411/412 |
| 4,645,396 | A * | 2/1987 | McCauley et al. | 411/387.2 |
| 4,655,661 | A * | 4/1987 | Brandt | 411/387.1 |
| 4,900,208 | A * | 2/1990 | Kaiser et al. | 411/387.1 |
| 5,046,905 | A * | 9/1991 | Piacenti et al. | 411/387.2 |
| RE33,901 | E * | 4/1992 | Shinjo | 411/387.1 |
| 5,413,444 | A * | 5/1995 | Thomas et al. | 411/387.1 |
| 5,865,584 | A * | 2/1999 | Onofrio | 411/411 |
| 6,022,177 | A * | 2/2000 | Hofer | 411/412 |
| 6,142,719 | A * | 11/2000 | Daubinger et al. | 411/387.8 |
| 6,164,887 | A * | 12/2000 | Palm | 411/387.7 |
| 6,402,448 | B1 * | 6/2002 | Dicke | 411/387.5 |
| 6,789,991 | B2 * | 9/2004 | Hsu | 411/387.6 |
| 6,887,023 | B1 * | 5/2005 | Lu et al. | 411/387.1 |
| 7,037,309 | B2 * | 5/2006 | Weil et al. | 606/73 |
| 7,090,452 | B2 * | 8/2006 | Chen | 411/387.1 |
| 7,090,453 | B2 * | 8/2006 | Lin | 411/387.1 |
| 2004/0018069 | A1 * | 1/2004 | Lai | 411/387.1 |
| 2004/0146377 | A1 * | 7/2004 | Chen | 411/387.4 |
| 2005/0186048 | A1 * | 8/2005 | Dicke | 411/387.4 |
| 2006/0153662 | A1 * | 7/2006 | Chen | 411/387.1 |

FOREIGN PATENT DOCUMENTS

JP                 407317738 A  * 12/1995

* cited by examiner

*Primary Examiner*—Flemming Saether
(74) *Attorney, Agent, or Firm*—Rosenberg, Klein & Lee

(57) ABSTRACT

A screw is provided that includes a head from which a shank extends. The shank has an end section at a distal end that includes a drilling portion. A conically-shaped tip potion is disposed at the distal end of the drilling portion and at least one guiding thread is spirally formed on the conically-shaped tip portion. A cutting edge is defined in the drilling portion by at least one groove formed therein.

5 Claims, 7 Drawing Sheets

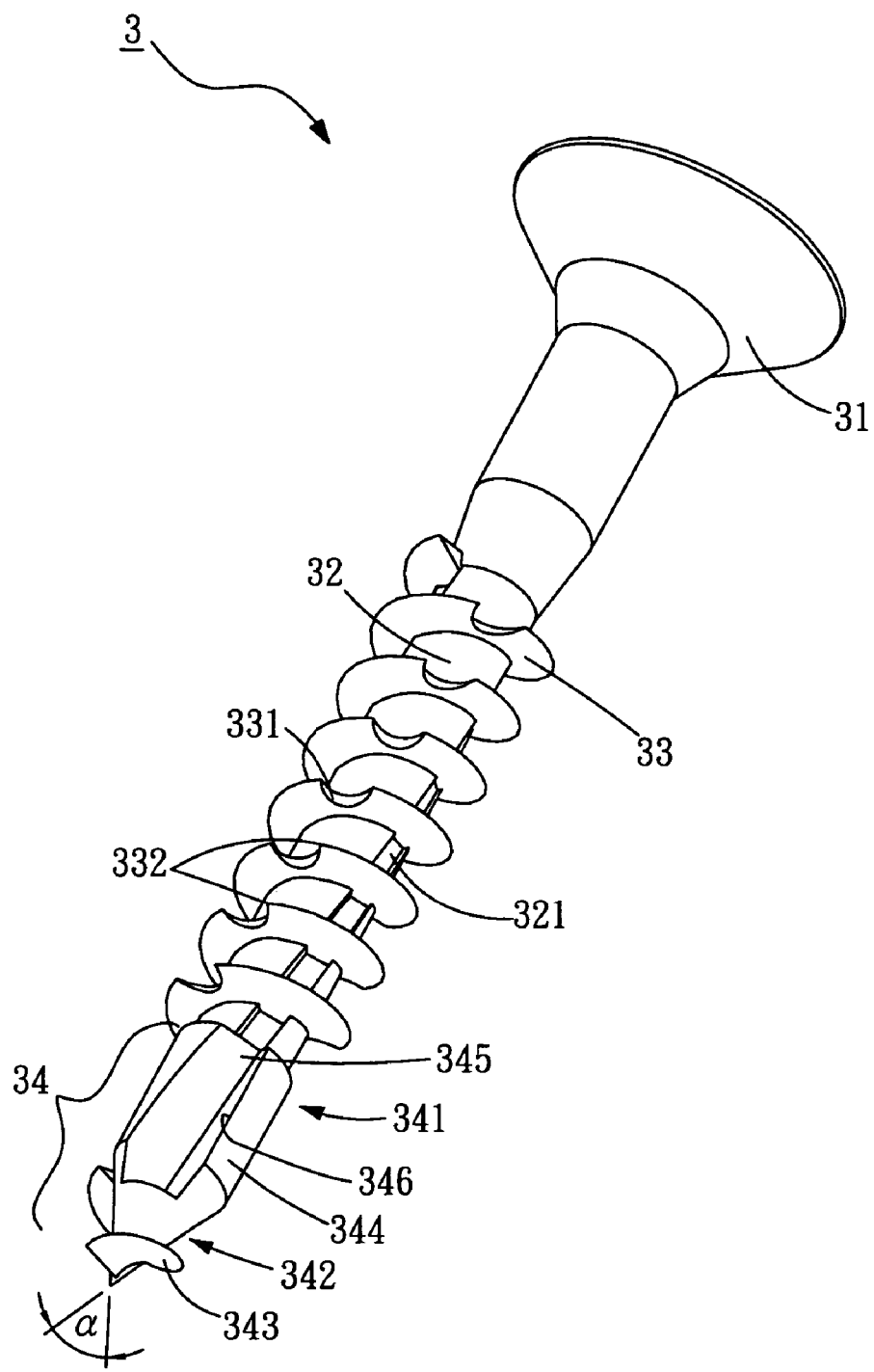
F I G . 2

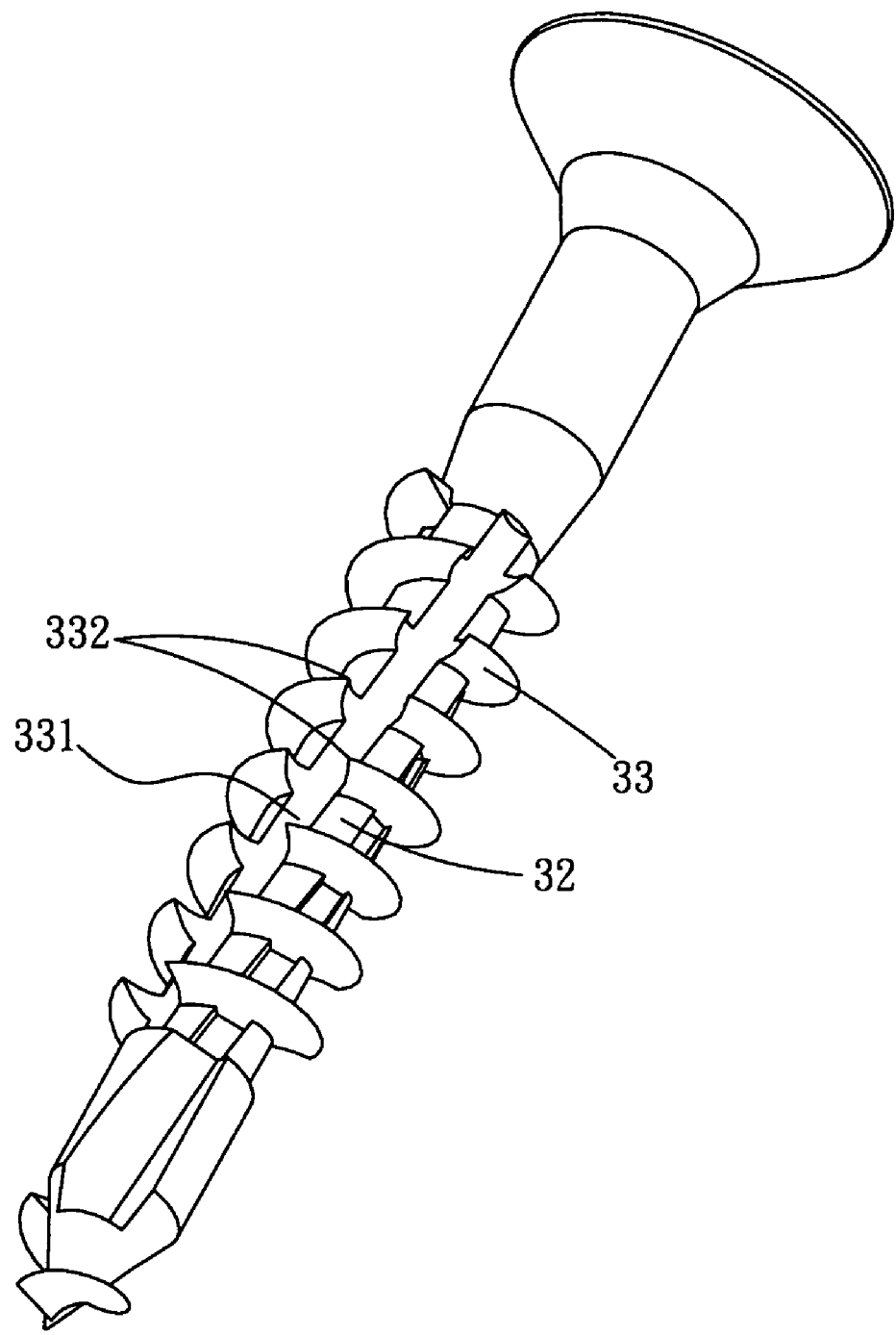
F I G . 4

SCREW WITH GUIDE WINGS

FIELD OF THE INVENTION

The present invention relates to a screw having design, and particularly to a guiding screw which is able to enhance the screwing speed, securement and labor-saving effects.

BACKGROUND OF THE INVENTION

A conventional screw 1 for quickly penetrating through hard object is disclosed in FIG. 1, and generally includes a head 11, a shank 12 extending therefrom, a plurality of threads 13 spirally formed on the shank 12 along the shank's axial line, and an end section 14 extending outwardly from the shank 12. The end section 14 has a drilling portion 141 formed on the shank 12, a conically-shaped tip portion 142 adjacent to the drilling portion 141 and a plurality of grooves 143 formed in the drilling portion 141 and the conically-shaped tip portion 142. Moreover, each groove 143 forms respective cuffing edges 144.

Some shortcomings are found when using the convention screw and described as follows:

1. The cone-shaped tip portion 142 lacks guiding device so that the screw 1 has to be maintained to be perpendicular to the object 2 or the screw 1 could slip away so that the user has to exert a large force to penetrate the cone-shaped tip portion 142 into the object 2 at the first stage of screwing the screw 1 into the object 2.

2. After the cone-shaped tip portion 142 is merged into the object 2, the cutting edges 144 cut the fibers of the object 2 and debris quickly fills the grooves 143. The resistance from the object 2 is increased because that the grooves 143 are filled with the debris and the debris expands laterally and a huge stress is applied to the cutting edges 144. This makes the penetration to be difficult and the cutting edges 144 could be broken.

3. Continuing the afore reasons, the accumulated debris of the object 2 might expand to crack the object 2 if the debris is not well guided away from the object 2.

4. The grooves 143 are defined only on the drilling portion 141 and the conically-shaped tip portion 142, so the fastening function therefore decreases.

Therefore the present invention provides a screw which is able to enhance the screwing speed, securing effect of the screw and labor-saving effects thereof.

SUMMARY OF THE INVENTION

The present invention relates to a screw which comprises a head, a shank extending therefrom, a plurality of threads spirally formed on the shank along the shank's axial line, and an end section extending outwardly from the shank. The end section comprises a drilling portion extending from the shank, a conically-shaped tip portion formed at the distal end of the drilling portion, and at least one guiding thread spirally disposed on the conically-shaped tip portion. The drilling portion forms a non-threaded area and has at least one groove extending therein to form at least one cuffing edge.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 shows a first embodiment of a screw of the present invention;

FIG. 4 shows a second embodiment of the screw of the present invention;

DETAILED DESCRIPTION OF THE PREFERRED EMBODIMENTS

Figure 1:
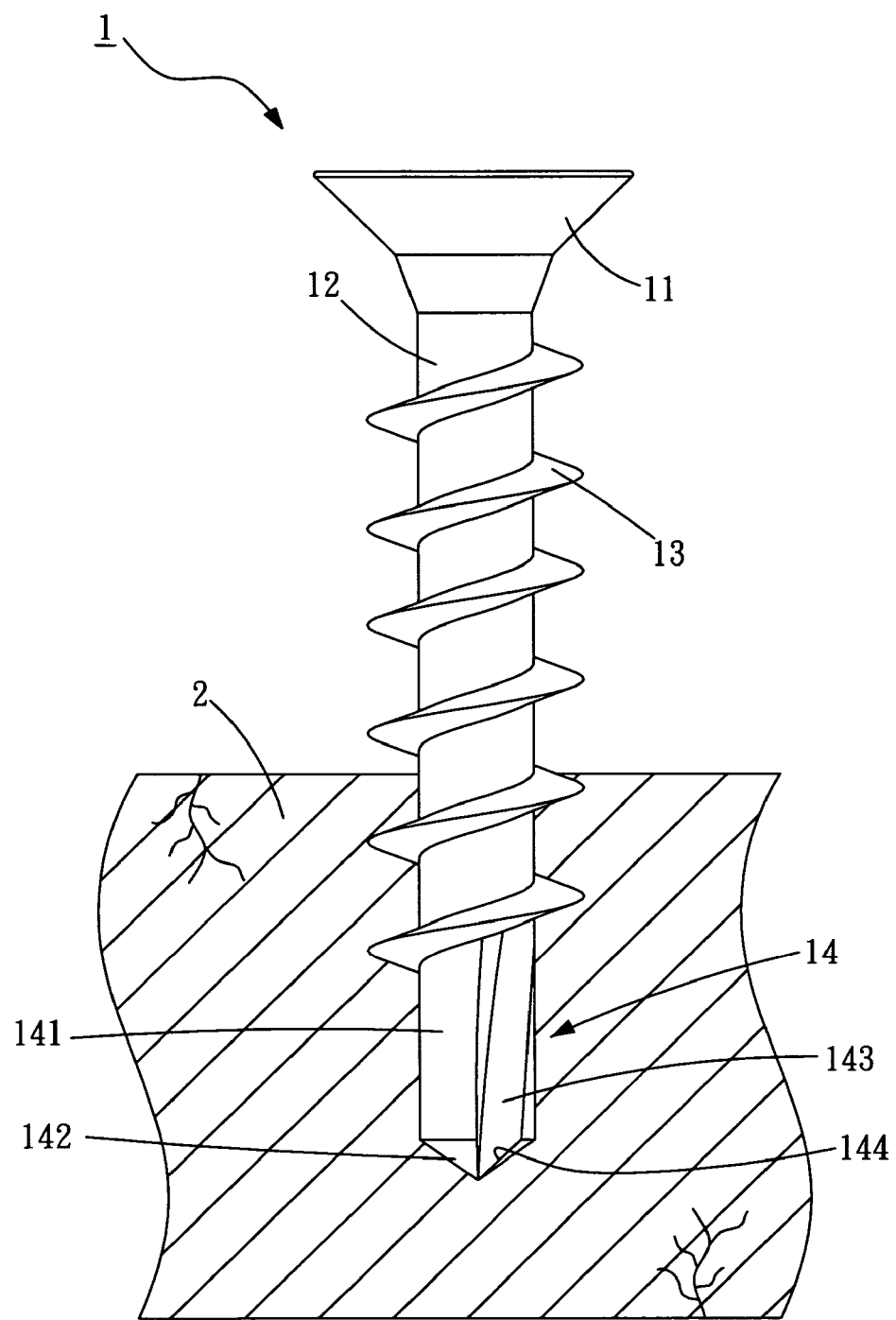
FIG. 1 shows a conventional screw penetrating into an object.

The following embodiments are explained in conjunction with either a wood board 5 or a metal plate 6.

Referring to FIG. 2, the screw 3 of the present invention comprises a head 31 and a shank 32 extending therefrom, a plurality of threads 33 spirally formed on the shank 32 along the shank's axial line, and an end section 34 extending outwardly from the shank 32. The end section 34 comprises a drilling portion 341 extending from the shank 32, a conically-shaped tip portion 342 formed at the distal end of the drilling portion 341, and at least one guiding thread 343 spirally disposed on the conically-shaped tip portion 342. The drilling portion 341 forms a non-threaded area 344. At least one groove 345 is formed in the end section 34, the groove 345 extending in the drilling portion 341 and in the conically-shaped tip portion 342. The at least one groove 345 forms at least one cuffing edge 346. The outer diameter of the drilling portion 341 is sized between the outer diameter of the shank 32 and the outer diameter of the threads 33, and the included angle "α" of the conically-shaped tip portion 342 is between 20-60 degrees and in FIG. 2 is shown at 35 degrees.

Figure 3:
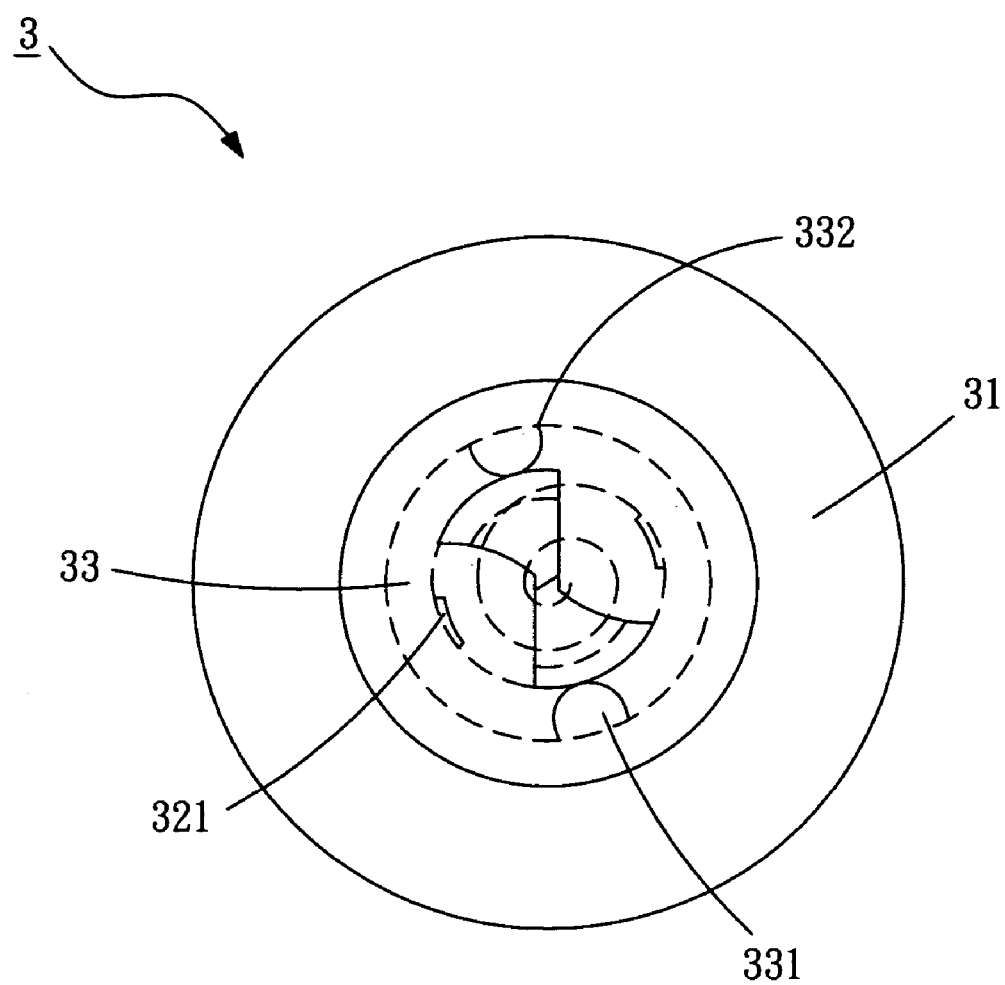
FIG. 3 shows an end view of the screw of the present invention.
Figures 5, 5A:
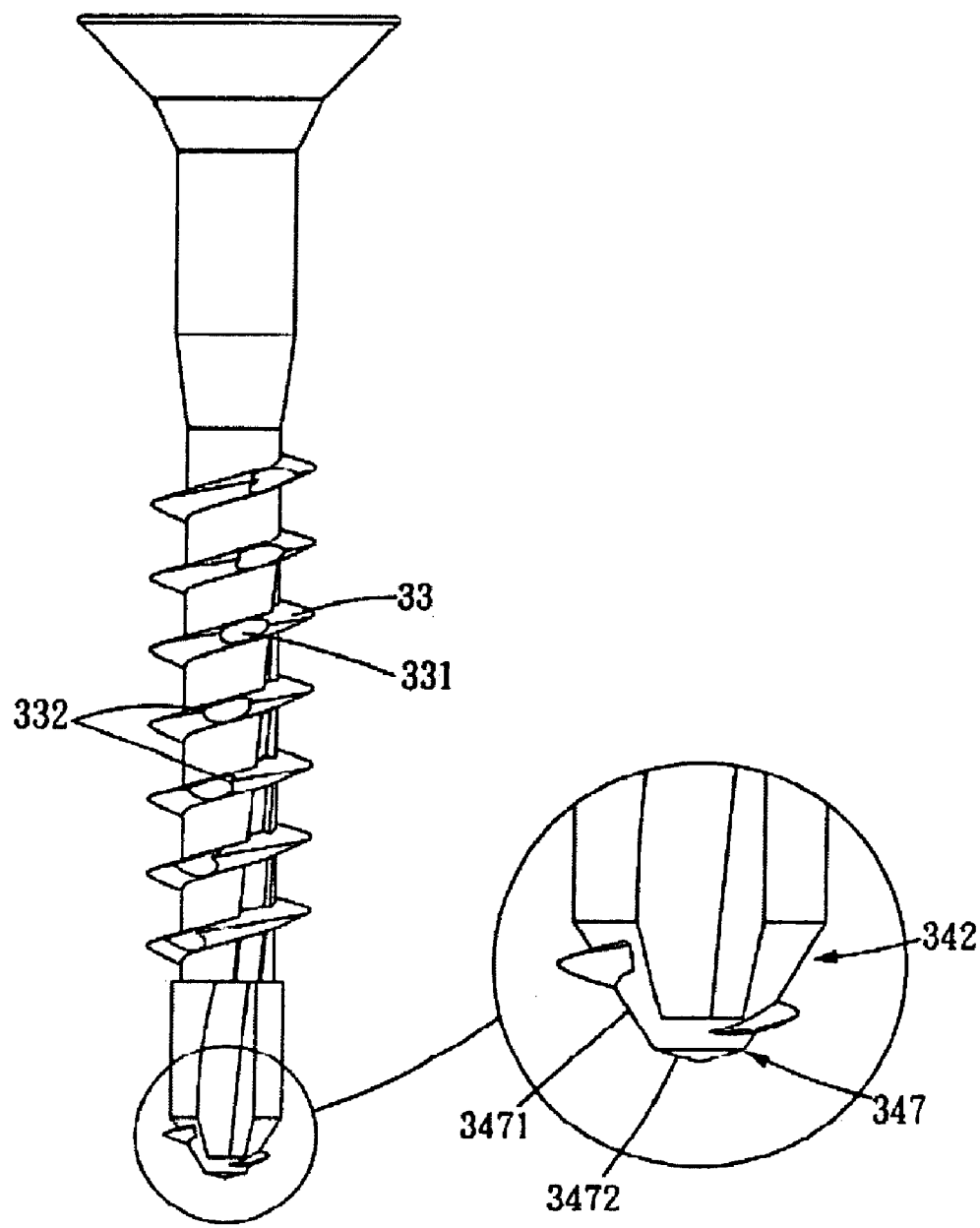
FIG. 5 shows a third embodiment of the screw of the present invention.
FIG. 5a is an enlarged view of the tip portion of the screw in FIG. 5.

Referring to FIG. 3, the threads 33 are spirally formed the shank 32, and are defined with a curve-shaped guiding groove 331 and a quadrangle-shaped containing groove 321. Moreover, each thread 33 forms two arcuate tips 332 thereon. In particular, the guiding groove 331 can be defined as shown in FIG. 4 and the conically-shaped tip portion 342 can be formed to two conical sections with different slopes 347, as shown in FIGS. 5 and 5a. The two conical sections with different slopes 347 therefore form a first slope 3471 and a second slope 3472, and are of benefit when Penetrating a metal plate.

Figure 6:
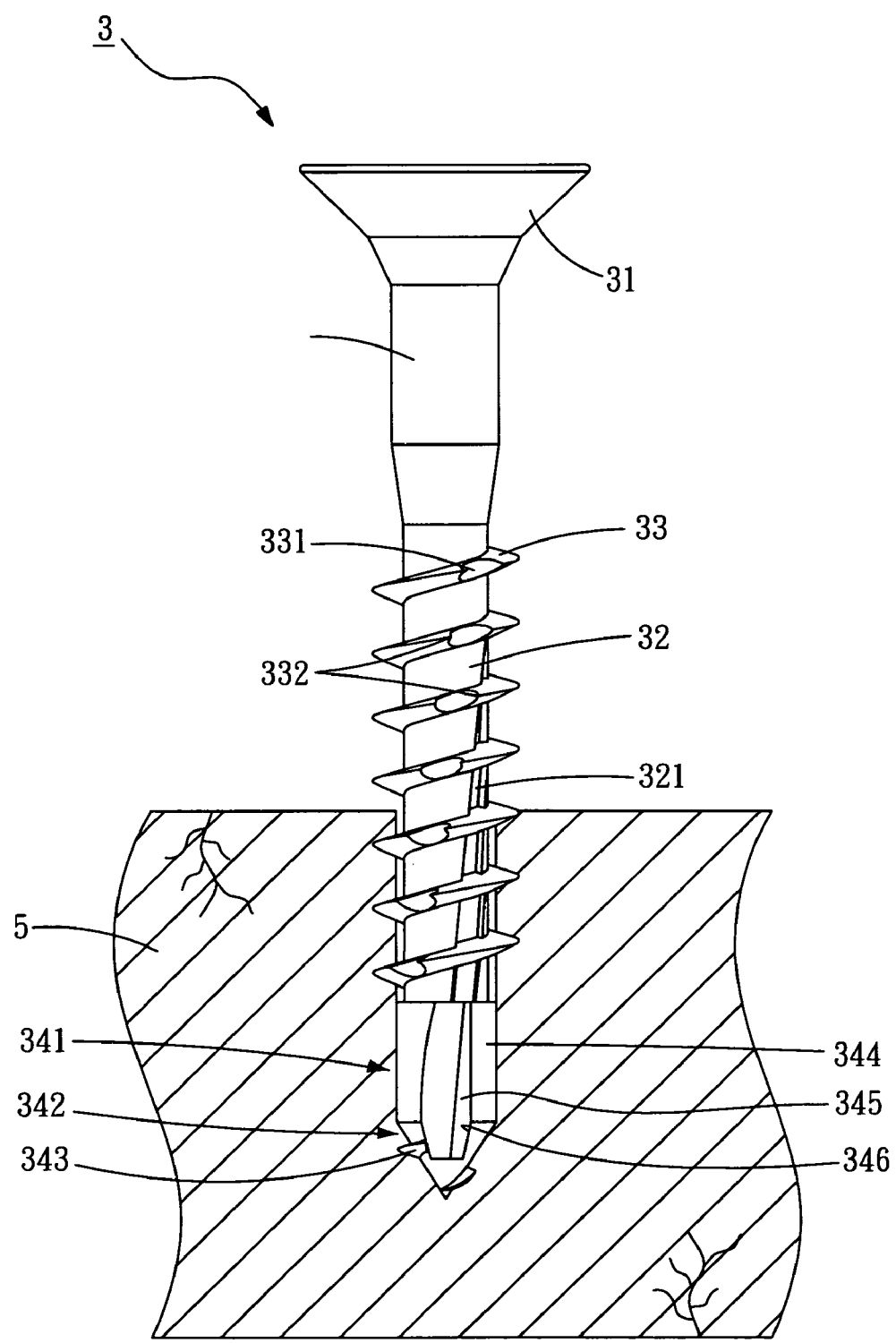
FIG. 6 shows the screw of the present invention penetrating into an object.

As shown in FIG. 6, during operation the user applies a screw torque on the head 31, so the conically-shaped tip portion 342 can easily penetrate into the object 5 with at least one guiding thread 343 which grasps and cuts the fibers of the object 5 at different angles. The arcuate tips 332 of the threads 33 and the at least one cutting edge 346 cut the fibers of the object 5 so that the screw 3 can easily screw into the object 5. Further, debris from the object 5 are guided away by the groove 345 and the containing groove 321, so the resistance between the object 5 and the screw 3 is less than the resistance between the object 5 and the conventional screw 1. The guiding groove 331 is advantageous for removing the debris of the object 5. Additionally, spreading the distance between adjacent threads 33 can be benefit to increase the grasping force of the screw 3 to the object 5.

Figure 7:
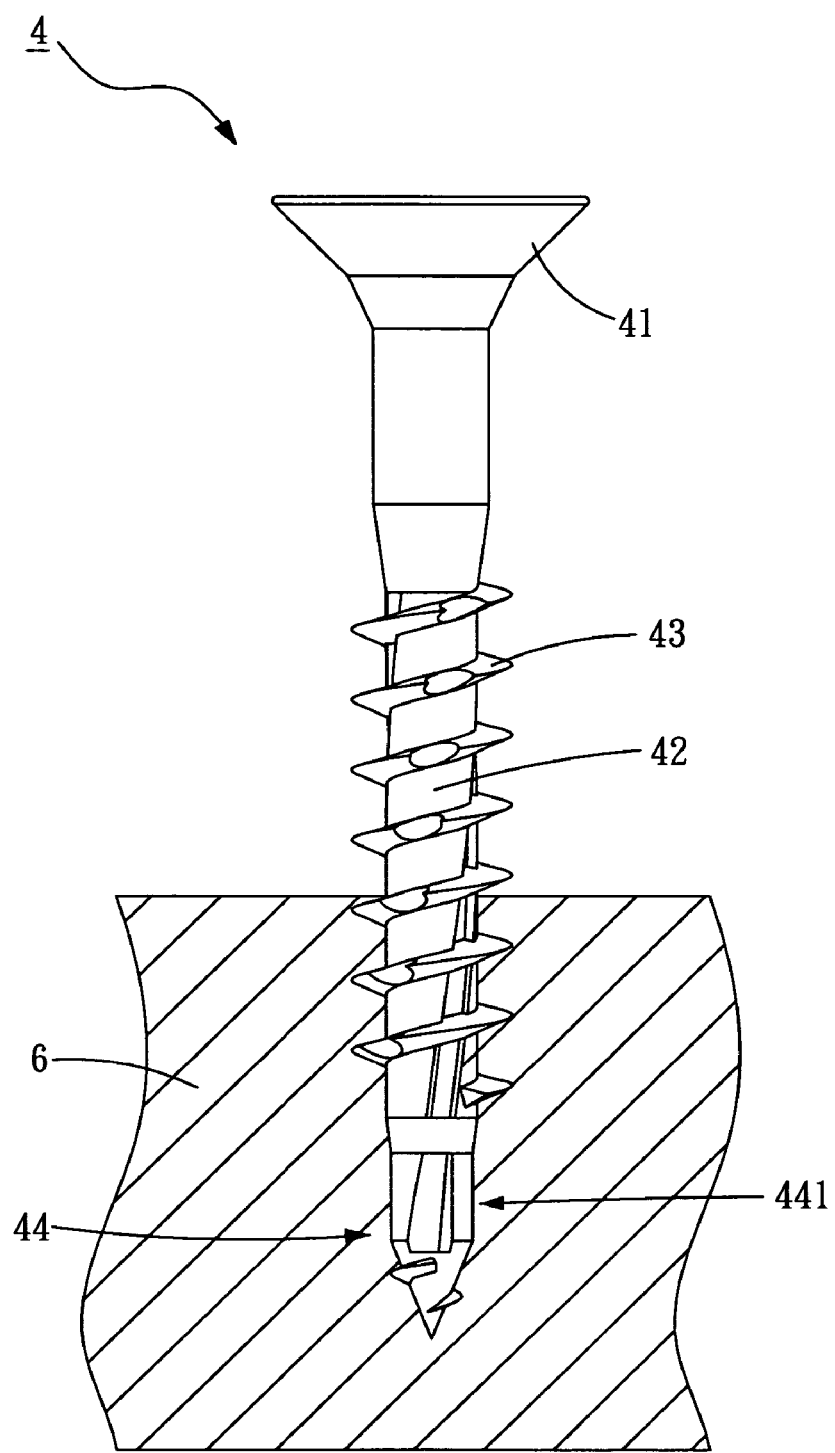
FIG. 7 shows a fourth embodiment of the screw of the present invention penetrating into an object.

FIG. 7 shows the screw 4 which includes a head 41, a shank 42 extending therefrom, a plurality of threads 43 spirally formed on the shank 42 along the shank's axial line, and an end section 44 extending outwardly from the shank 42. These elements being structurally related to one another as in the prior embodiments. The only difference is that an outer diameter of the end section 44 is smaller than an outer diameter of the shank 42 and an outer diameter of the threads 43. The screw 4 is used to penetrate a metal object 6 and the smaller end section 44 efficiently penetrates into the hard metal object 6.

While we have shown and described the embodiment in accordance with the present invention, it should be clear to those skilled in the art that further embodiments may be made without departing from the scope of the present invention.

What is claimed is:

1. A screw comprising:
   a head;
   a shank extending from the head;
   a plurality of threads spirally formed on the shank; and
   an end section extending from the shank, the end section having a drilling portion devoid of threads adjacent to the shank and a conically-shaped tip portion formed at a distal end of the drilling portion, the drilling portion having at least one groove formed therein defining at least one cutting edge, the conically-shaped tip portion having a spirally formed guiding thread formed thereon;
   wherein an outer diameter of the end section is sized between an outer diameter of the shank and an outer diameter of the threads.

2. The screw as claimed in claim 1, wherein the conically-shaped tip portion has an included angle in a range between 20-60 degrees.

3. The screw as claimed in claim 1, wherein the shank has a containing groove formed in an outer periphery thereof, the containing groove extending between opposing ends of the shank.

4. A screw comprising:
   a shank extending from the head;
   a plurality of threads spirally formed on the shank; and
   an end section extending from the shank, the end section having a drilling portion devoid of threads adjacent to the shank and a conically-shaped tip portion formed at a distal end of the drilling portion, the drilling portion having at least one groove formed therein defining at least one culling edge, the conically-shaped tip portion having a spirally formed guiding thread formed thereon;
   wherein at least one guiding groove is formed in each of the plurality of threads to form arcuate tips thereon.

5. A screw comprising:
   a head;
   a shank extending from the head, the shank having a containing groove formed in an outer periphery thereof and extending between opposing ends of the shank;
   a plurality of threads spirally formed on the shank; and
   an end section extending from the shank, the end section having a drilling portion devoid of threads adjacent to the shank and a tip portion formed at a distal end of the drilling portion, the drilling portion having at least one groove formed therein defining at least one cutting edge;
   wherein the tip portion has a spirally formed guiding thread formed thereon.

* * * * *